US010502123B2

(12) United States Patent
Mito et al.

(10) Patent No.: US 10,502,123 B2
(45) Date of Patent: Dec. 10, 2019

(54) CONTROL DEVICE FOR VEHICLE, AND CONTROL METHOD FOR VEHICLE

(71) Applicant: HONDA MOTOR CO., LTD., Tokyo (JP)

(72) Inventors: Shintaro Mito, Wako (JP); Masahiro Takeuchi, Wako (JP); Atsushi Kurauchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 15/384,318

(22) Filed: Dec. 20, 2016

(65) Prior Publication Data

US 2017/0218835 A1 Aug. 3, 2017

(30) Foreign Application Priority Data

Jan. 28, 2016 (JP) ................................ 2016-013911

(51) Int. Cl.

| | |
|---|---|
| ***F02B 37/18*** | (2006.01) |
| ***B60W 20/40*** | (2016.01) |
| ***F02B 33/34*** | (2006.01) |
| ***F02D 41/04*** | (2006.01) |
| ***F02D 41/06*** | (2006.01) |
| ***F02N 11/08*** | (2006.01) |
| ***F02D 41/00*** | (2006.01) |

(52) U.S. Cl.

CPC ........... *F02B 37/183* (2013.01); *B60W 20/40* (2013.01); *F02B 33/34* (2013.01); *F02D 41/0007* (2013.01); *F02D 41/042* (2013.01); *F02D 41/065* (2013.01); *F02N 11/0814* (2013.01); *B60W 2710/0638* (2013.01); *B60W 2710/08* (2013.01); *B60Y 2400/435* (2013.01); *Y02T 10/144* (2013.01); *Y10S 903/93* (2013.01)

(58) Field of Classification Search

CPC ...... F02B 37/18–37/186; F02D 41/042; F02D 41/065; F02N 11/0814

See application file for complete search history.

(56) References Cited

U.S. PATENT DOCUMENTS

2017/0306834 A1* 10/2017 Takahashi ............... F02B 37/18

FOREIGN PATENT DOCUMENTS

JP 2014-227955 12/2014

* cited by examiner

*Primary Examiner* — Ngoc T Nguyen

(74) *Attorney, Agent, or Firm* — Mori & Ward, LLP

(57) ABSTRACT

A control device for a vehicle includes an opening degree sensor to detect an opening degree of a wastegate valve disposed in a bypass passage bypassing a turbine. Circuitry is configured to stop an internal combustion engine while the vehicle is driven by a motor in a motor drive mode. The circuitry is configured to calculate a target opening degree of the wastegate valve to be larger than a maximum error between the opening degree detected by the opening degree sensor and an actual opening degree of the wastegate valve. The circuitry is configured to control the wastegate valve such that the opening degree detected by the opening degree sensor is equal to the target opening degree while the vehicle is driven in the motor drive mode.

10 Claims, 6 Drawing Sheets

VEHICLE OFF
ENGINE DRIVE
MOTOR DRIVE
ENGINE DRIVE
I/S
VEHICLE OFF

SUPERCHARGING
F/C
F/C
NE
0

WGO
0
WGX
WGX
TWAIT
t0
t1
t2
t3
t4
t5
t6
t7
t8
t

CONTROL DEVICE FOR VEHICLE, AND CONTROL METHOD FOR VEHICLE

CROSS-REFERENCE TO RELATED APPLICATIONS

The present application claims priority under 35 U.S.C. § 119 to Japanese Patent Application No. 2016-013911, filed Jan. 28, 2016, entitled "Control Device for Vehicle." The contents of this application are incorporated herein by reference in their entirety.

BACKGROUND

1. Field

The present disclosure relates to a control device for a vehicle and a control method for a vehicle.

2. Description of the Related Art

Japanese Unexamined Patent Application Publication No. 2014-227955 discloses a control device for an internal combustion engine that includes a turbocharger and a wastegate valve. When performing idle reduction control in which the engine is automatically stopped if predetermined automatic stop conditions are met, this control device stops power supply to an actuator for the wastegate value in order to reduce power consumption. As a result, the closed state of the wastegate valve is no longer maintained. Thus, if engine restart conditions are met during the idle reduction control, power supply to the actuator is started to close the wastegate valve and then the engine is restarted. Vibration at the time of the restart is suppressed by closing the wastegate valve before the engine is restarted.

SUMMARY

According to one aspect of the present invention, there is provided a control device for a vehicle including an internal combustion engine and a motor as drive sources, the internal combustion engine including a turbocharger and a wastegate valve, the turbocharger including a turbine disposed in an exhaust passage and a compressor driven by the turbine to rotate and pressurize air to be sucked by the internal combustion engine, the wastegate valve being disposed in a bypass passage that bypasses the turbine, the vehicle having a motor drive mode in which the vehicle runs by using the motor alone as the drive source. The control device includes a temporarily stopping unit, an opening degree detector, and a valve controller. The temporarily stopping unit automatically stops the internal combustion engine while the vehicle is running in the motor drive mode. The opening degree detector detects an opening degree of the wastegate valve. The valve controller sets a target opening degree of the wastegate valve to a predetermined opening degree in the motor drive mode and controls the wastegate valve to make the opening degree detected by the opening degree detector equal to the target opening degree. The predetermined opening degree is set such that a non-contact condition is satisfied, the non-contact condition being a condition in which an actual opening degree of the wastegate valve does not become smaller than or equal to a fully-closed-state opening degree when an error between the detected opening degree and the actual opening degree becomes equal to an expected maximum value.

According to another aspect of the present invention, a control device for a vehicle including both of an internal combustion engine and a motor to drive the vehicle and a turbocharger having a turbine disposed in an exhaust passage includes an opening degree sensor and circuitry. The opening degree sensor is to detect an opening degree of a wastegate valve disposed in a bypass passage bypassing the turbine. The circuitry is configured to stop the internal combustion engine while the vehicle is driven by the motor in a motor drive mode. The circuitry is configured to calculate a target opening degree of the wastegate valve to be larger than a maximum error between the opening degree detected by the opening degree sensor and an actual opening degree of the wastegate valve. The circuitry is configured to control the wastegate valve such that the opening degree detected by the opening degree sensor is equal to the target opening degree while the vehicle is driven in the motor drive mode.

According to further aspect of the present invention, a control method for a vehicle including both of an internal combustion engine and a motor to drive the vehicle and a turbocharger having a turbine disposed in an exhaust passage includes detecting an opening degree of a wastegate valve disposed in a bypass passage bypassing the turbine. The internal combustion engine is stopped while the vehicle is driven by the motor alone. A target opening degree of the wastegate valve is calculated to be larger than a closed degree by at least a maximum error between the opening degree and an actual opening degree of the wastegate valve. The closed degree is an opening degree of the wastegate valve which is fully closed. The wastegate valve is controlled such that the opening degree is equal to the target opening degree while the vehicle is driven by the motor alone.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
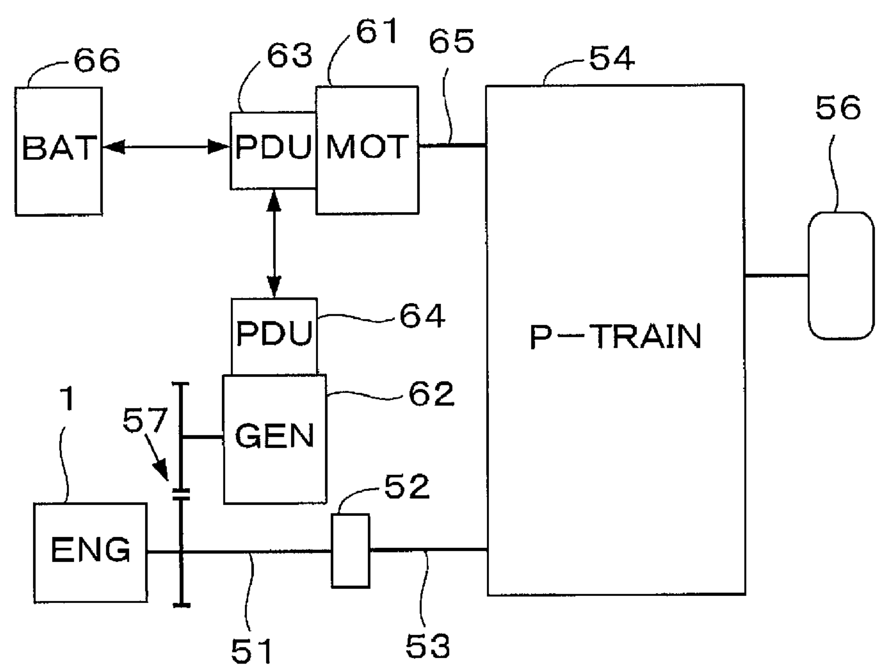
FIG. 1 is a diagram illustrating the configuration of a vehicle drive system according to an embodiment of the present disclosure.

The embodiment(s) will now be described with reference to the accompanying drawings, wherein like reference numerals designate corresponding or identical elements throughout the various drawings.

An embodiment of the present disclosure will be described below with reference to the accompanying drawings.

FIG. 1 is a diagram illustrating the configuration of a vehicle drive system that drives a vehicle according to an embodiment of the present disclosure. This vehicle drive system includes an internal combustion engine 1 (hereinafter, referred to as an "engine 1") and a motor 61 which serve as drive sources, a generator 62 driven by the engine 1 or electric power accumulated in a high-voltage battery 66, and a driving force transmission mechanism 54 that transmits driving force produced by the engine 1 and the motor 61 to a driving wheel 56. An output shaft 51 of the engine 1 is connected to the driving force transmission mechanism 54 through a clutch 52 and a drive shaft 53. An output shaft 65 of the motor 61 is connected directly to the driving force transmission mechanism 54. The motor 61 operates as a generator when it performs a regenerative operation. The driving force transmission mechanism 54 includes a differential gear mechanism.

The output shaft 51 of the engine 1 is connected to the generator 62 through a gear pair 57. The generator 62 generates electric power by using the driving force produced by the engine 1. The motor 61 and the generator 62 are electrically connected to power drive units 63 and 64 (hereinafter, referred to as "PDUs 63 and 64"), respectively. The PDU 63 is connected to the PDU 64 and the high-voltage battery 66. The PDUs 63 and 64 are connected to a motor-controlling electronic control unit (not illustrated). The PDUs 63 and 64 control operations of the motor 61 and the generator 62, respectively, and control charging and discharging of the high-voltage battery 66.

The vehicle drive system illustrated in FIG. 1 operates in the following operation modes.

A first operation mode is an operation mode in which the vehicle runs by using the output of the motor 61 which is driven by electric power supplied from the high-voltage battery 66. In the first operation mode, the engine 1 is stopped and the clutch 52 is released (disengaged). The first operation mode is also referred to as a motor drive mode.

A second operation mode is an operation mode in which the clutch 52 is released and the engine 1 is started to allow the generator 62 to generate electric power, and the vehicle runs by using the output of the motor 61 that is driven by the generated electric power. In the second operation mode, the high-voltage battery 66 is charged using surplus electric power if electric power generated by the generator 62 is more than electric power consumed by the motor 61, whereas a power deficiency is compensated for by discharging the high-voltage battery 66 if electric power generated by the generator 62 is less than electric power consumed by the motor 61.

A third operation mode is an operation mode in which the vehicle runs by mainly using the output of the engine 1. In the third operation mode, the clutch 52 is engaged and the output of the engine 1 is input to the driving force transmission mechanism 54 and is transmitted to the driving wheel 56. In the third operation mode, the torque may become surplus or deficient due to a change in the engine load. If the torque is surplus, the motor 61 is caused to operate as a generator to charge the high-voltage battery 66. On the other hand, if the torque is deficient, the engine output is compensated for by the output of the motor 61.

The second and third operation modes are also collectively referred to as an engine drive mode. In the engine drive mode, the engine 1 is automatically stopped (hereinafter, referred to as "idle reduction control") when predetermined idle reduction execution conditions are met. The predetermined idle reduction execution conditions are met, for example, when conditions such as the vehicle speed VP being a predetermined speed or lower, the accelerator pedal not being pressed, the brake pedal being pressed, the remaining battery charge of the high-voltage battery 66 being a predetermined level or more, the engine coolant temperature being a predetermined temperature or higher, and warming-up of the engine 1 being completed are satisfied.

Figure 2:
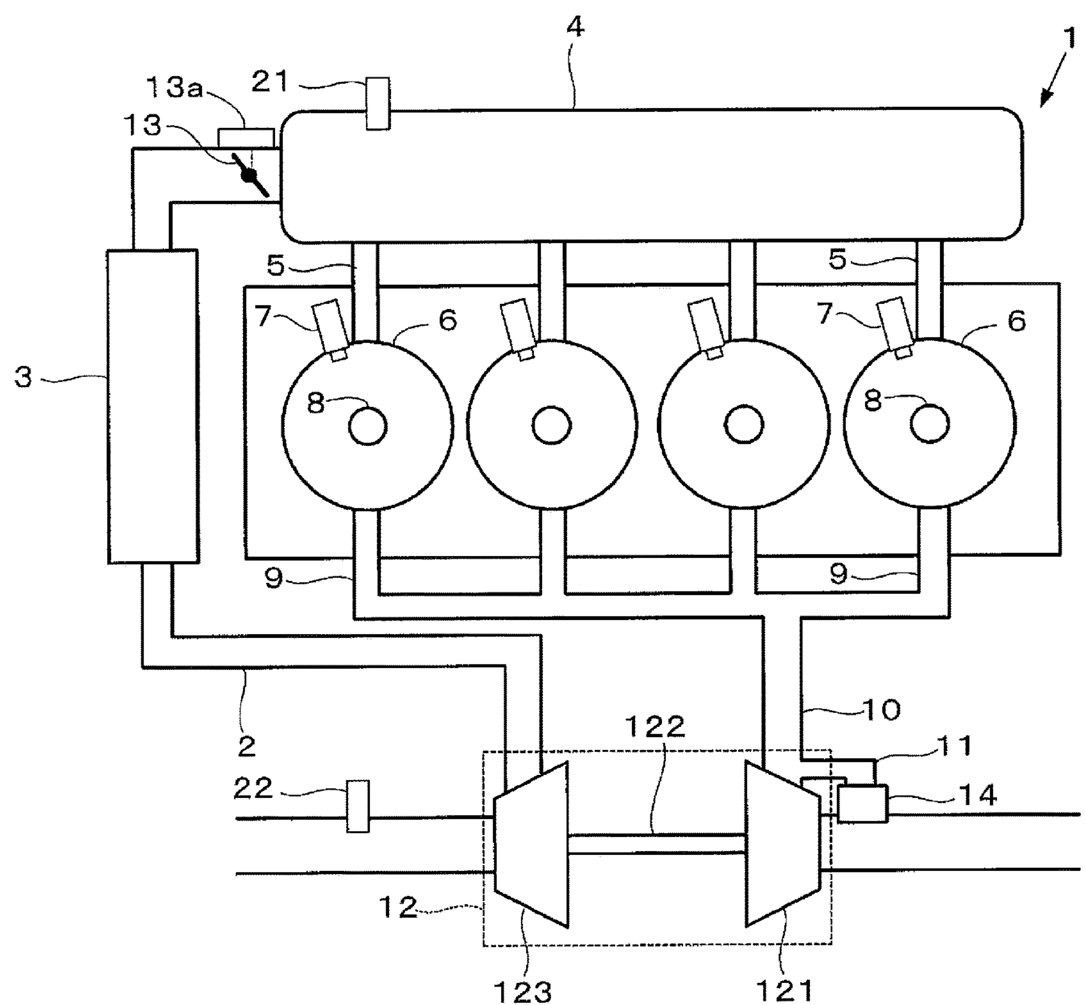
FIG. 2 is a diagram schematically illustrating the configuration of an internal combustion engine illustrated in FIG. 1.

FIG. 2 is a diagram schematically illustrating the configuration of the engine 1. The engine 1 is a direct injection engine including four cylinders 6 and configured to inject fuel directly into the combustion chamber of each of the cylinders 6. Each of the cylinders 6 includes a fuel injection valve 7, a spark plug 8, an intake valve (not illustrated), and an exhaust valve (not illustrated).

The engine 1 includes an intake passage 2, an exhaust passage 10, and a turbocharger (supercharger) 12. The intake passage 2 is connected to a surge tank 4. The surge tank 4 is connected to the combustion chamber of each of the cylinders 6 through an intake manifold 5. An intercooler 3 for cooling pressurized air and a throttle valve 13 are disposed in the intake passage 2. The throttle valve 13 can be driven by a throttle actuator 13*a*. An intake pressure sensor 21 that detects intake pressure PB is disposed in the surge tank 4. An intake airflow sensor 22 that detects the intake airflow GAIR is disposed in the intake passage 2.

The turbocharger 12 is disposed in the exhaust passage 10. The turbocharger 12 includes a turbine 121 driven to spin by kinetic energy of the exhaust air and a compressor 123 coupled to the turbine 121 through a shaft 122. The compressor 123 is disposed in the intake passage 2 and pressurizes (compresses) air to be sucked by the engine 1.

The combustion chamber of each of the cylinders 6 of the engine 1 is connected to the exhaust passage 10 through an exhaust manifold 9. The exhaust passage 10 is connected to a bypass passage 11 that bypasses the turbine 121. In the bypass passage 11, a wastegate valve 14 (hereinafter, referred to as a "WG valve 14") that controls the exhaust airflow that passes through the bypass passage 11 is disposed.

Figure 3A:
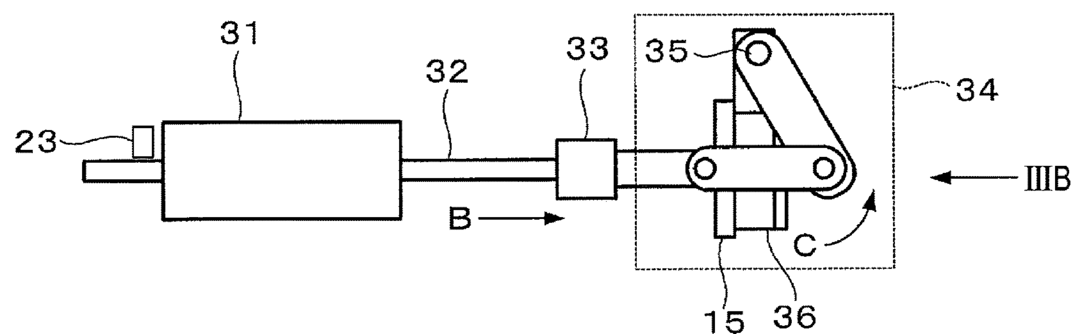
FIGS. 3A and 3B are diagrams schematically illustrating a drive mechanism that drives a valve body of a wastegate valve illustrated in FIG. 2.
Figure 3B:
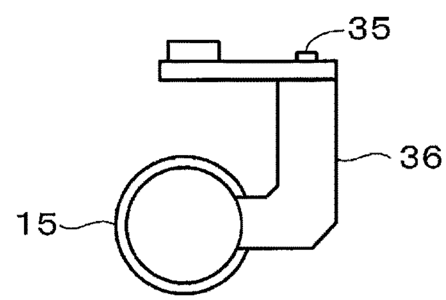

FIGS. 3A and 3B are diagrams schematically illustrating a driving mechanism for driving a valve body 15 of the WG valve 14. The valve body 15 is driven to open or close by a motor 31, a rod 32, a heat-shielding member 33, and a link mechanism 34. FIG. 3B is a diagram viewed from the direction of arrow IIIB in FIG. 3A. The link mechanism 34 is configured such that a support member 36 to which the valve body 15 is fixed is rotatable with respect to a rotation shaft 35.

FIG. 3A corresponds to a state where the WG valve 14 is fully closed, that is, the bypass passage 11 is shut. When the motor 31 is driven to rotate, the rod 32 moves in a straight-line direction indicated by arrow B in FIG. 3A, the support member 36 and the valve body 15 rotate with respect to the rotation shaft 35 of the link mechanism 34 as indicated by arrow C, and the WG valve 14 opens. A valve opening sensor 23 (an opening degree sensor 23) of the WG valve 14 is disposed in the vicinity of the rod 32. The valve opening sensor 23 detects an opening degree WGO of the WG valve 14 (hereinafter, referred to as a "WG opening degree WGO") by detecting the position of the rod 32 in the straight-line direction (direction of the arrow B). Note that the WG valve 14 is configured to open or close an opening at which the bypass passage 11 communicates with the exhaust passage 10 on the downstream side of the turbine 121 in the present embodiment.

Figure 4:
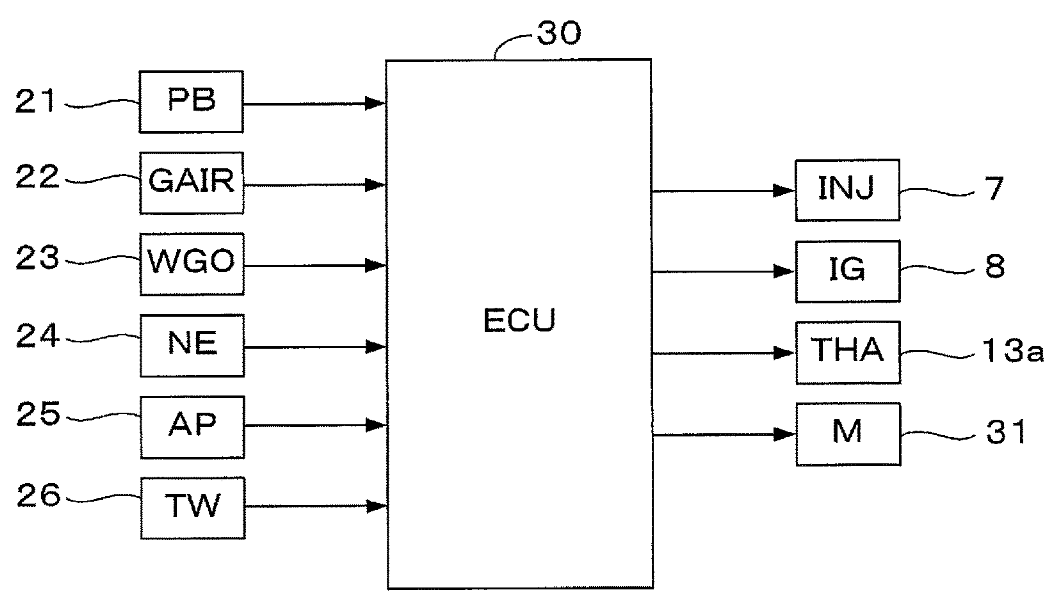
FIG. 4 is a block diagram illustrating the configuration of a control system that controls the internal combustion engine illustrated in FIG. 2.

FIG. 4 is a block diagram illustrating the configuration of a control system that controls the engine 1. The control system includes an electronic control unit 30 (hereinafter, referred to as an "ECU 30" or circuitry 30). In addition to the intake pressure sensor 21, the intake airflow sensor 22, and the valve opening sensor 23 which are described above, an engine speed sensor 24, an accelerator pedal position sensor 25, a coolant temperature sensor 26, and other sensors (not illustrated) are connected to the ECU 30, and detection signals obtained by these sensors are supplied to the ECU 30. The engine speed sensor 24 detects the engine speed NE of the engine 1. The accelerator pedal position sensor 25 detects how much the accelerator pedal (not illustrated) of the vehicle driven by the engine 1 is pressed (hereinafter, referred to as an "accelerator pedal operation amount AP"). The coolant temperature sensor 26 detects the engine coolant temperature TW. The fuel injection valve 7, the spark plug 8, the throttle actuator 13*a*, and the motor 31 of the driving mechanism for the WG valve 14 are connected to the output of the ECU 30.

The ECU 30 performs fuel injection control by using the fuel injection valve 7, ignition control by using the spark plug 8, turbine driving control by using the WG valve 14, and intake airflow control by using the throttle valve 13 in accordance with the engine operation state (mainly the engine speed NE and a required torque TRQD). The required torque TRQD is calculated in accordance mainly with the accelerator pedal operation amount AP such that the required torque TRQD increases as the accelerator pedal operation amount AP increases.

Driving control of the motor 31 is performed during turbine driving control so that the detected WG opening degree WGO becomes substantially equal to a target opening degree WGCMD. The accuracy of the detected WG opening degree WGO is desired to be increased in order to precisely make an actual opening degree WGA of the WG valve 14 substantially equal to the target opening degree WGCMD.

As described above, since the valve opening sensor 23 is not a sensor that directly detects the position of the valve body 15, the detected WG opening degree WGO contains many types of error as follows:

1) Assembly Error EA: An error caused when the WG valve 14 and the driving mechanism therefor are assembled to the engine 1;

2) Wear Error EF: An error due to wearing of components of the driving mechanism;

3) Deformation Error ET: An error due to deformation of components of the driving mechanism;

4) Temperature-dependent Error EH: An error caused by expansion and contraction of components of the driving mechanism due to temperature change;

5) Measurement Error EM: An error caused by the valve opening sensor 23 and the ECU 30; and 6) Displacement Error EP: An error due to a slight relative displacement (so-called "rattling") of components of the driving mechanism (error equivalent to a small opening degree that varies due to vibration caused while the vehicle is running).

Accordingly, fully-closed-state opening degree learning in which a valve opening degree WGFC detected by the valve opening sensor 23 when the valve body 15 has reached the fully closed position is learned as a reference opening degree is performed at an appropriate timing, and an opening degree obtained by subtracting the reference opening degree WGFC from an opening degree WGDET output by the valve opening sensor 23 is detected as the WG opening WGO during control of the WG valve opening degree. Since errors other than part of the measurement error EM (error due to AD conversion) and the displacement error EP are removed immediately after the learning is performed, the WG opening degree WGO is substantially equal to the actual opening degree WGA. The temperature-dependent error EH varies depending on the change in temperature at and in the vicinity of the WG valve 14. If the temperature changes greatly after the learning is performed, the difference between the WG opening WGO and the actual opening degree WGA increases until the fully-closed-state opening degree learning is performed again.

In the present embodiment, low-temperature-state learning and operating-state learning are respectively performed at a timing immediately after the ignition switch is switched on (when the temperature of the engine 1 is low) and at a learning executable timing while the engine 1 is operating. The assembly error EA and the wear error EF are successfully removed by performing the low-temperature-state learning. Further, the temperature-dependent error EH is successfully removed by performing the operating-state learning.

Figures 5A, 5B, 5C:
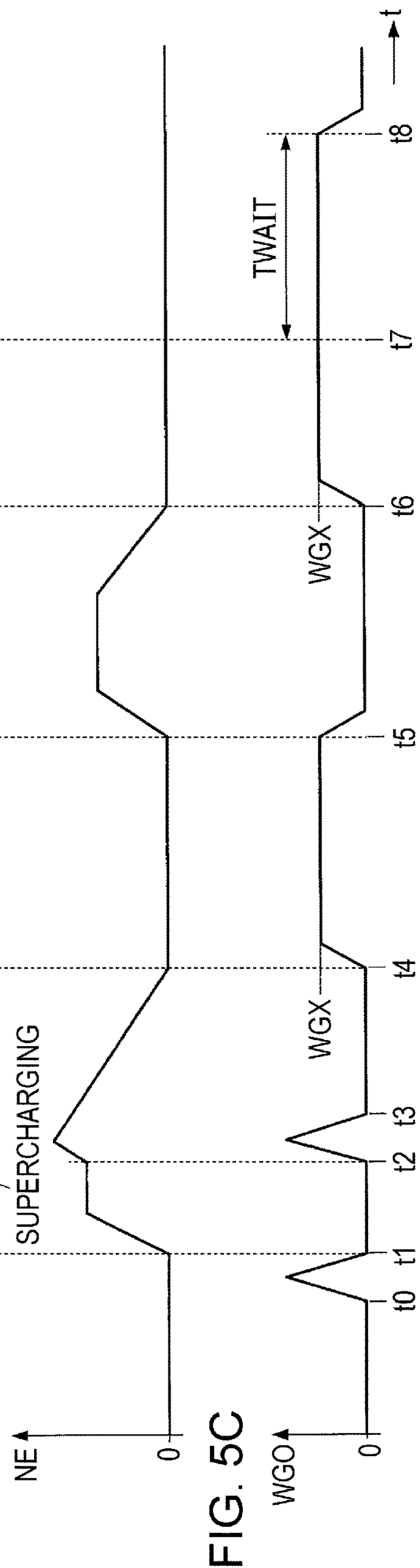
FIGS. 5A to 5C are time charts for describing how the opening degree of the wastegate valve is controlled.

FIGS. 5A to 5C are time charts for describing how the WG opening degree WGO is controlled in the present embodiment. FIGS. 5A to 5C respectively illustrate how the operation state of the vehicle, the engine speed NE, and the WG opening degree WGO change.

The ignition switch is switched on at time t0, in response to which learning of the fully-closed-state opening degree of the WG valve 14 (low-temperature-state learning) is performed. The engine drive mode is started at time t1, and supercharging is performed by the turbocharger 12 in response to the increase in the engine speed NE. At time t2, the WG valve 14 is opened in order to reduce the boost pressure. Thereafter, the fully-closed-state opening degree learning (operating-state learning) is performed again at time t3 at which the WG valve 14 enters the fully closed state. After the supercharging operation is performed, a fuel-saving operation (F/C) is performed, and the vehicle enters the motor drive mode at time t4. At that time, the WG valve 14 is opened to a predetermined opening degree WGX (e.g., an opening degree equal to approximately 13% of the fully-opened-state opening degree).

Specifically, the motor 31 is driven so that the detected WG opening degree WGO becomes substantially equal to the target opening degree WGCMD which is set to the predetermined opening degree WGX. Power supply to the motor 31 is stopped upon the WG opening degree WGO reaching the target opening degree WGCMD.

The predetermined opening degree WGX is set such that a non-contact condition is satisfied. The non-contact condition is a condition in which the valve body 15 does not come into contact with the inner wall of the passages when the error between the opening degree WGDET output by the valve opening sensor 23 and the actual opening degree WGA becomes substantially equal to an expected maximum value EMAX. Specifically, the predetermined opening degree WGX is set to satisfy the non-contact condition in which the predetermined opening degree WGX is greater than or equal to a threshold WGTH that is obtained by adding the expected maximum value EMAX of the error to a fully-closed-state opening degree (=0) and is set to the threshold WGTH that is the minimum opening degree that satisfies the non-contact condition. That is, the non-contact condition is represented by Expression (1), and the predetermined opening degree WGX is represented by Expression (2).

$$WGX \geq WGTH = 0 + EMAX \tag{1}$$

$$WGX = WGTH = 0 + EMAX \tag{2}$$

The maximum value EMAX is the maximum value of the sum of the error other than the assembly error EA and the wear error EF which are removed by the low-temperature-state learning, that is, the maximum value of the sum of the deformation error ET, the temperature-dependent error EH, the measurement error EM, and the displacement error EP, and is determined in advance through an experiment.

The vehicle enters the engine drive mode at time t5. At that time, the target opening degree WGCMD is set to the fully-closed-state opening degree (i.e., 0), and then an operation for closing the WG valve 14 and an operation for starting the engine 1 are performed in parallel. The fuel saving operation is started slightly before time t6, and the idle reduction control is started at time t6. When the idle reduction control is started, the target opening degree WGCMD is set to the predetermined opening degree WGX. Power supply to the motor 31 is stopped upon the WG opening degree WGO reaching the target opening degree WGCMD.

At time t7, the ignition switch is switched off. At time t8, which is after a predetermined wait period TWAIT from time t7, the target opening degree WGCMD is set to "0" and the WG valve 14 is closed.

Figure 6:
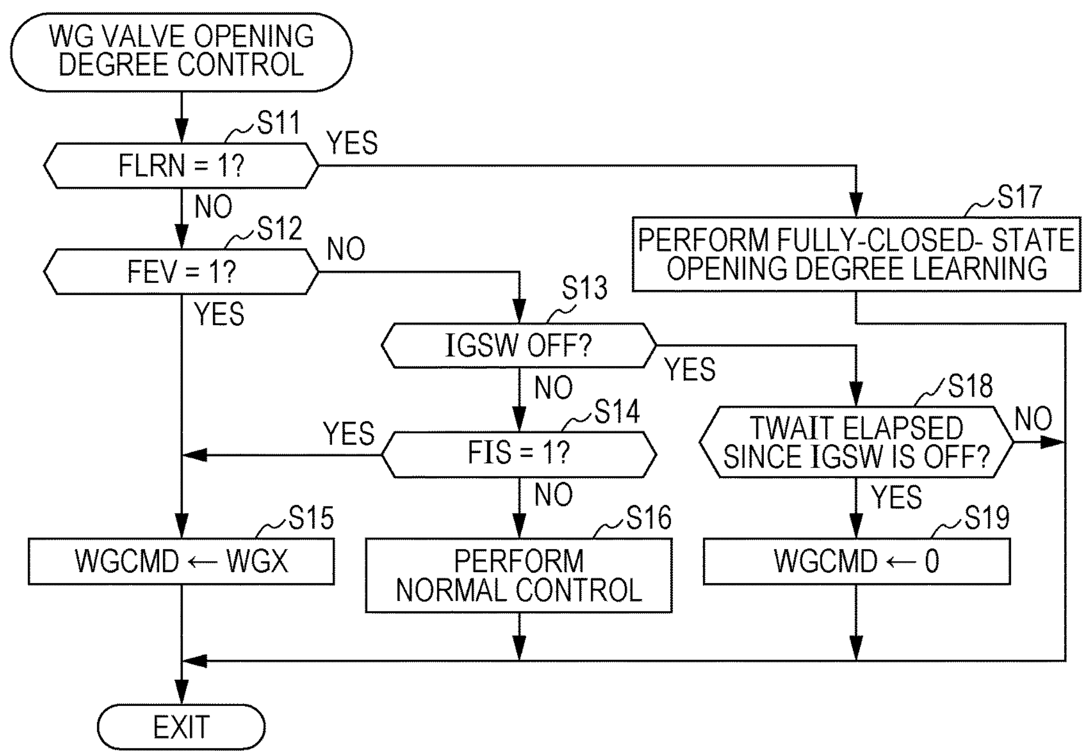
FIG. 6 is a flowchart of a process of controlling the opening degree of the wastegate valve.

FIG. 6 is a flowchart of the above-described process of controlling the opening degree of the WG valve 14. This process is performed by the ECU 30 at predetermined intervals.

In step S11, the ECU 30 determines whether a learning flag FLRN is equal to "1". The learning flag FLRN is set to "1" a timing immediately after the ignition switch is switched on or after the WG valve 14 is opened while the turbocharger is operating as described above. If the answer is positive (YES) in step S11, the ECU 30 performs the fully-closed-state opening degree learning (step S17).

If the answer is negative (NO) in step S11, the ECU 30 determines whether a motor drive mode flag FEV is equal to "1" (step S12). If the answer is positive (YES) in step S12, the ECU 30 sets the target opening degree WGCMD to the predetermined opening degree WGX (step S15) and drives the motor 31 to make the WG opening degree WGO becomes substantially equal to the target opening degree WGCMD. The ECU 30 stops outputting a driving signal to the motor 31 upon the WG opening degree WGO becoming substantially equal to the target opening degree WGCMD.

If the answer is negative (NO) in S12, that is, if the vehicle is not in the motor drive mode, the ECU 30 determines whether the ignition switch is switched off (step S13). If the answer is negative (NO) in step S13, the ECU 30 determines whether an idle reduction flag FIS is equal to "1" (step S14). The idle reduction flag FIS is set to "1" when idle reduction execution conditions are satisfied. If the answer is positive (YES) in step S14, that is, if the idle reduction operation is to be performed, the process proceeds to step S15.

If the idle reduction flag FIS is equal to "0", the process proceeds to step S16. In step S16, the ECU 30 performs normal control, that is, controls the WG opening degree in accordance with the operation state of the engine 1.

If the ignition switch is switched off, the process proceeds from step S13 to step S18. In step S18, the ECU 30 determines whether the predetermined wait period TWAIT has passed from switching off of the ignition switch. If the answer is negative (NO) in step S18, the ECU 30 ends processing. If the answer becomes positive (YES), the ECU 30 sets the target opening degree WGCMD to "0" and controls the WG valve 14 to the fully-closed-state opening degree (step S19).

As described above, while the vehicle is running in the motor drive mode in which the vehicle is driven by using the motor 61 alone as its drive source, the engine 1 is automatically stopped and the target opening degree WGCMD of the WG valve 14 is set to the predetermined opening degree WGX and the WG valve 14 is controlled so that the WG opening degree WGO detected by the valve opening sensor 23 becomes substantially equal to the target opening degree WGCMD in the present embodiment. At that time, since the predetermined opening degree WGX is set such that the non-contact condition in which the actual opening degree WGA does not become smaller than or equal to the fully-closed-state opening degree (i.e., 0) when the error between the WG opening degree WGO and the actual opening degree WGA becomes substantially equal to the expected maximum value EMAX is satisfied, the valve body 15 of the WG valve 14 may be prevented from coming into contact with the inner wall of the bypass passage or the exhaust passage and from producing noise. In addition, since power supply to the motor 31 that drives the valve body 15 of the WG valve 14 is stopped when the detected WG opening degree WGO is substantially equal to the target opening degree WGCMD, the occurrence of electromagnetic noise may be prevented.

The non-contact condition is a condition in which the predetermined opening degree WGX is greater than or equal to the threshold WGTH obtained by adding the expected maximum value EMAX of the detection error to the fully-closed-state opening degree of "0". The predetermined opening degree WGX is set to the minimum value of the opening degree range that satisfies the non-contact condition, that is, to the threshold WGTH. Thus, the valve body 15 may be prevented from coming into contact with the inner wall of the passages for sure, and the WG valve 14 is successfully controlled to the fully-closed-state opening degree (i.e., 0) quickly when the engine 1 is restarted. In addition, since the exhaust airflow that passes through the WG valve 14 before the WG valve 14 is fully closed during the valve closing operation performed when the engine 1 is restarted is small, the negative influence of the valve becoming open in the motor drive mode (e.g., deterioration of the response characteristic) can be kept within an ignorable level.

The WG valve 14 is disposed in the vicinity of the turbocharger 12, and the temperature changes greatly at the WG valve 14 and the driving mechanism therefor. Thus, the temperature-dependent error EH due to the change in temperature is large. In addition, if there is so-called "rattling" which results from a relative displacement of components and which is caused by vibration that occurs while the vehicle is running, the valve body 15 may come into contact with the inner wall of the passages while the vehicle is running, even if the valve body 15 does not come into contact with the inner wall while the vehicle is stationary. Accordingly, by including the temperature-dependent error and the error due to "rattling" in the error contained in the WG opening degree WGO, noise may be prevented for sure.

Further, the target opening degree WGCMD is set to the fully-closed-state opening degree when the motor driving mode ends, that is, before the engine 1 is restarted. The restart of the engine 1 and the operation for closing the WG valve 14 are performed in parallel. Accordingly, the engine 1 can be restarted smoothly and quickly.

In the present embodiment, the control device for a vehicle includes the ECU 30, the motor-controlling electronic control unit (not illustrated), and the sensors connected to these control units. In addition, the valve opening sensor 23 corresponds to an opening degree detector. The ECU 30 serves as a temporarily stopping unit and a valve controller. The driving mechanism of the WG valve 14 serves as part of the valve controller.

Note that the present disclosure is not limited to the embodiment described above, and various modifications may occur. For example, the predetermined opening degree WGX is set to the minimum value (WGTH) of the opening degree range that satisfies the non-contact condition in the above-described embodiment; however, the predetermined opening degree WGX may be set to a value larger than the minimum value.

In addition, the example in which the engine 1 is a direct-injection four-cylinder engine has been described in the embodiment above; however, the present disclosure is applicable regardless of the number of cylinders of the engine or the configuration of the fuel supply device, and the engine 1 may be a diesel engine.

According to a first aspect, there is provided a control device for a vehicle including an internal combustion engine (1) and a motor (61) as drive sources, the internal combustion engine including a turbocharger (12) and a wastegate valve (14), the turbocharger including a turbine (121) disposed in an exhaust passage (10) and a compressor (123) driven by the turbine to rotate and pressurize air to be sucked by the internal combustion engine, the wastegate valve being disposed in a bypass passage (11) that bypasses the turbine, the vehicle having a motor drive mode in which the vehicle runs by using the motor alone as the drive source. The control device includes a temporarily stopping unit, an opening degree detector (23), and a valve controller. The temporarily stopping unit automatically stops the internal combustion engine while the vehicle is running in the motor drive mode. The opening degree detector detects an opening degree (WGO) of the wastegate valve. The valve controller sets a target opening degree (WGCMD) of the wastegate valve to a predetermined opening degree (WGX) in the motor drive mode and controls the wastegate valve (14) to make the opening degree (WGO) detected by the opening degree detector equal to the target opening degree (WGCMD). The predetermined opening degree (WGX) is set such that a non-contact condition is satisfied, the non-contact condition being a condition in which an actual opening degree (WGA) of the wastegate valve does not become smaller than or equal to a fully-closed-state opening degree (0) when an error between the detected opening degree (WGO) and the actual opening degree (WGA) becomes equal to an expected maximum value (EMAX).

With this configuration, while the vehicle is running in the motor drive mode in which the vehicle is driven by using the motor alone as the drive source, the internal combustion engine is automatically stopped and the target opening degree of the wastegate valve is set to the predetermined opening degree, and then the wastegate valve is controlled to make the opening degree detected by the opening degree detector be equal to the target opening degree. At that time, the predetermined opening degree is set such that the non-contact condition is satisfied in which the actual opening degree of the wastegate valve does not become smaller than or equal to the fully-closed-state opening degree when the error between the detected opening degree and the actual opening degree becomes equal to the expected maximum value. Thus, the valve body of the wastegate valve may be prevented from coming into contact with the inner wall of the bypass passage or the exhaust passage and from making noise even if the detected opening degree contains the error. In addition, since a drive signal is not supplied to an actuator that drives the wastegate valve when the detected opening degree is equal to the target opening degree, the occurrence of electromagnetic noise may be prevented.

According to a second aspect, in the control device according to the first aspect, the non-contact condition may be a condition in which the predetermined opening degree (WGX) is greater than or equal to a threshold (WGTH) obtained by adding the expected maximum value (EMAX) of the error to the fully-closed-state opening degree (0), and the predetermined opening degree (WGX) may be set to the threshold (WGTH) that is a minimum opening degree that satisfies the non-contact condition.

With this configuration, the non-contact condition is a condition in which the predetermined opening degree is greater than or equal to a threshold obtained by adding the expected maximum value of the error to the fully-closed-state opening degree, and the predetermined opening degree is set to the threshold that is the minimum opening degree that satisfies the non-contact condition. Thus, the valve body may be prevented from coming into contact with the inner wall of the passages for sure, and the wastegate valve is successfully controlled to achieve the fully-closed-state opening degree quickly when the internal combustion engine is restarted. In addition, since only a small airflow of exhaust passes through the wastegate valve before the wastegate valve is fully closed during the valve closing operation performed when the internal combustion engine is restarted, the negative influence of the wastegate valve becoming open in the motor drive mode (e.g., deterioration of the response characteristic) is kept within an ignorable level.

According to a third aspect, in the control device according to the first or second aspect, the error may include an error due to temperature-change-induced expansion and contraction of components of a driving mechanism that drives the wastegate valve and an error induced by a relative displacement of the components of the driving mechanism.

The wastegate valve is disposed in the vicinity of the turbocharger and the temperature changes greatly at the wastegate valve and the driving mechanism of the wastegate valve. Thus, the temperature-dependent error due to the change in temperature is large. In addition, if there is so-called "rattling" which results from a relative displacement of the components and which is caused by vibration that occurs while the vehicle is running, the valve body may come into contact with the inner wall of the passages while the vehicle is running, even if the valve body does not come into contact with the inner wall while the vehicle is stationary. Accordingly, by including the temperature-dependent error and the error due to "rattling" in the error, noise may be prevented for sure.

According to a fourth aspect, in the control device according to the first or second aspect, in a case where the motor drive mode is ended and the internal combustion engine is restarted, the valve controller may set the target opening degree (WGCMD) to the fully-closed-state opening degree before the internal combustion engine is restarted and then the restart of the internal combustion engine and an operation for closing the wastegate valve may be performed in parallel.

With this configuration, when the motor drive mode is ended, the target opening degree is set to the fully-closed-state opening degree before the internal combustion engine is restarted, and the restart of the internal combustion engine and the operation for closing the wastegate valve are performed in parallel. Accordingly, the internal combustion engine is restarted smoothly and quickly.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a vehicle including an internal combustion engine and a motor as drive sources, the internal combustion engine including a turbocharger and a wastegate valve, the turbocharger including a turbine disposed in an exhaust passage and a compressor driven by the turbine to rotate and pressurize air to be sucked by the internal combustion engine, the wastegate valve being disposed in a bypass passage that bypasses the turbine, the vehicle having a motor drive mode in which the vehicle runs by using the motor alone as the drive source, the control device comprising:

a temporarily stopping unit that automatically stops the internal combustion engine while the vehicle is running in the motor drive mode;

an opening degree detector that detects an opening degree of the wastegate valve; and a valve controller that sets a target opening degree of the wastegate valve to a predetermined opening degree in the motor drive mode and controls the wastegate valve to make the opening degree detected by the opening degree detector equal to the target opening degree, wherein the predetermined opening degree is set such that a non-contact condition is satisfied, the non-contact condition being a condition in which an actual opening degree of the wastegate valve does not become smaller than or equal to a fully-closed-state opening degree when an error between the detected opening degree and the actual opening degree becomes equal to an expected maximum value, the actual opening degree being estimated using a reference opening degree value measured using the opening degree detector at a predetermined operating time when the wastegate valve is at a fully-closed-state opening degree.

2. The control device according to claim 1, wherein the non-contact condition is a condition in which the predetermined opening degree is greater than or equal to a threshold obtained by adding the expected maximum value of the error to the fully-closed-state opening degree, and wherein the predetermined opening degree is set to the threshold that is a minimum opening degree that satisfies the non-contact condition.

3. The control device according to claim 1, wherein the error includes an error due to temperature-change-induced expansion and contraction of components of a motor that drives the wastegate valve and an error induced by a relative displacement of the components of the motor.

4. The control device according to claim 1, wherein in a case where the motor drive mode is ended and the internal combustion engine is restarted, the valve controller sets the target opening degree to the fully-closed-state opening degree before the internal combustion engine is restarted and then the restart of the internal combustion engine and an operation for closing the wastegate valve are performed in parallel.

5. A control device for a vehicle including both of an internal combustion engine and a motor to drive the vehicle and a turbocharger having a turbine disposed in an exhaust passage, comprising:

an opening degree sensor to detect an opening degree of a wastegate valve disposed in a bypass passage bypassing the turbine; and circuitry configured to:

stop the internal combustion engine while the vehicle is driven by the motor in a motor drive mode;

calculate a target opening degree of the wastegate valve to be larger than a maximum error between the opening degree detected by the opening degree sensor and an actual opening degree of the wastegate valve, the actual opening degree being estimated using a reference opening degree value measured using the opening degree sensor at a predetermined operating time when the wastegate valve is at a fully-closed-state opening degree; and control the wastegate valve such that the opening degree detected by the opening degree sensor is equal to the target opening degree while the vehicle is driven in the motor drive mode.

6. The control device according to claim 5, wherein the target opening degree is greater than or equal to a threshold obtained from the maximum error, and wherein the target opening degree is set to the threshold.

7. The control device according to claim 5, wherein the maximum error is obtained from an error due to temperature-change-induced expansion and contraction of components of a motor to drive the wastegate valve and an error induced by a relative displacement of the components of the motor.

8. The control device according to claim 1, wherein in a case where the internal combustion engine is restarted, the circuitry controls the wastegate valve to set the target opening degree to the zero degree before the internal combustion engine is restarted and then the restart of the internal combustion engine and an operation for closing the wastegate valve are performed in parallel.

9. The control device according to claim 5, wherein the turbocharger includes a compressor driven by the turbine to rotate and pressurize air to be sucked by the internal combustion engine.

10. A control method for a vehicle including both of an internal combustion engine and a motor to drive the vehicle and a turbocharger having a turbine disposed in an exhaust passage, comprising:

detecting an opening degree of a wastegate valve disposed in a bypass passage bypassing the turbine;

stopping the internal combustion engine while the vehicle is driven by the motor in a motor drive mode;

calculating a target opening degree of the wastegate valve to be larger than a maximum error between the detected opening degree and an actual opening degree of the wastegate valve, the actual opening degree being estimated using a reference opening degree value measured using the opening degree detector at a predetermined operating time when the wastegate valve is at a fully-closed-state opening degree; and controlling the wastegate valve such that the detected opening degree is equal to the target opening degree while the vehicle is driven in the motor mode.

* * * * *